(12) United States Patent
Slosarczyk et al.

(10) Patent No.: US 9,597,963 B2
(45) Date of Patent: Mar. 21, 2017

(54) METHOD FOR CONTROLLING AN ELECTRICAL SYSTEM IN A VEHICLE

(71) Applicant: Jaguar Land Rover Limited, Coventry (GB)

(72) Inventors: Krzysztof Slosarczyk, Coventry (GB);
Fernando Lages, Coventry (GB);
Kevin Cockings, Coventry (GB);
Stephen Pickering, Coventry (GB);
Jakub Mikos, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/426,191

(22) PCT Filed: Sep. 11, 2013

(86) PCT No.: PCT/EP2013/068857
§ 371 (c)(1),
(2) Date: Mar. 5, 2015

(87) PCT Pub. No.: WO2014/041043
PCT Pub. Date: Mar. 20, 2014

(65) Prior Publication Data
US 2015/0217641 A1    Aug. 6, 2015

(30) Foreign Application Priority Data
Sep. 11, 2012    (GB) .................................. 1216128.7

(51) Int. Cl.
*B60L 9/00*        (2006.01)
*B60L 1/00*        (2006.01)
(Continued)

(52) U.S. Cl.
CPC ................ *B60L 1/00* (2013.01); *B60L 11/18* (2013.01); *B60R 16/0231* (2013.01);
(Continued)

(58) Field of Classification Search
CPC ...... B60W 10/06; B60W 10/11; B60W 10/24; B60W 10/26; B60L 1/00; B60L 11/1861;
(Continued)

(56) References Cited

U.S. PATENT DOCUMENTS 5,164,655 A    11/1992  Heavey
8,204,670 B2 *  6/2012  Watanabe ............. B60W 10/06
                                                    701/93

(Continued)

FOREIGN PATENT DOCUMENTS

EP    1 595 748 A1    11/2005
EP    2 168 827 A1     3/2010
(Continued)

OTHER PUBLICATIONS

International Search Report, PCT/EP2013/068857, Sep. 5, 2014, 3 pages.
(Continued)

*Primary Examiner* — Behrang Badii
(74) *Attorney, Agent, or Firm* — Myers Bigel, P.A.

(57) ABSTRACT

A method for controlling an electrical system in a vehicle. The electrical system (11) comprises: at least a first switch (ES2) arranged such that operating the switches will isolate a part of the electrical system; and a control unit, the control unit being arranged to operate the switches. The method comprises: putting the control unit into a first operational mode, the first operational mode comprising at least a first arrangement of switches; receiving a request to enter a second operational mode, the second operational mode comprising at least a second arrangement of switches; determining the priority of the first and second operational modes at least in part by consulting a database of operational modes and their priorities; switching the control unit into the second operational mode if the second operational mode has
(Continued)

a higher priority than the first operational mode; and continuing in the first operational mode otherwise.

16 Claims, 3 Drawing Sheets

(51) Int. Cl.
*B60L 11/18* (2006.01)
*B60R 16/023* (2006.01)
*B60R 16/03* (2006.01)
*B60W 10/24* (2006.01)
*B60W 10/26* (2006.01)
*H02J 7/14* (2006.01)
*H02J 7/34* (2006.01)
*B60W 10/06* (2006.01)
*B60W 10/11* (2012.01)
*G06F 7/00* (2006.01)
*B60L 3/00* (2006.01)
*H02J 7/00* (2006.01)
*B60L 7/26* (2006.01)
*F02D 28/00* (2006.01)
*F02D 45/00* (2006.01)
*B60L 8/00* (2006.01)
*H02J 1/08* (2006.01)
*F02N 11/08* (2006.01)

(52) U.S. Cl.
CPC ............ *B60R 16/03* (2013.01); *B60W 10/24* (2013.01); *B60W 10/26* (2013.01); *H02J 7/1423* (2013.01); *H02J 7/345* (2013.01); B60L 3/0092 (2013.01); B60L 7/26 (2013.01); B60L 8/00 (2013.01); B60L 11/1861 (2013.01); B60W 10/06 (2013.01); B60W 10/11 (2013.01); F02D 28/00 (2013.01); F02D 45/00 (2013.01); F02N 11/08 (2013.01); G06F 7/00 (2013.01); H02J 1/08 (2013.01); H02J 7/00 (2013.01); H02J 7/14 (2013.01); Y02T 10/7005 (2013.01); Y02T 90/168 (2013.01); Y04S 30/12 (2013.01)

(58) Field of Classification Search
CPC ...... B60L 11/1866; B60L 3/0092; B60L 7/26; Y02T 90/168; Y04S 30/12; G01R 31/327; B60T 7/042; B60T 7/085; F02D 28/00; F02D 45/00; H02J 7/00; H02J 7/14; H02J 1/08; H02J 7/1423; F02N 11/08
See application file for complete search history.

(56) References Cited

U.S. PATENT DOCUMENTS

| | | | |
|---|---|---|---|
| 2002/0140397 A1* | 10/2002 | Hasegawa | H02J 7/1423 320/104 |
| 2005/0200201 A1 | 9/2005 | Jabaji et al. | |
| 2007/0188130 A1 | 8/2007 | Scheucher | |
| 2011/0025124 A1* | 2/2011 | Brabec | B60L 11/1861 307/9.1 |
| 2011/0115285 A1* | 5/2011 | Ransom | B60L 11/1811 307/9.1 |
| 2011/0241421 A1 | 10/2011 | Schaefer | |
| 2011/0320109 A1* | 12/2011 | Polimeno | B60L 3/0092 701/113 |
| 2012/0095636 A1* | 4/2012 | Ishii | A01D 34/64 701/22 |

FOREIGN PATENT DOCUMENTS

| | | |
|---|---|---|
| EP | 2 365 603 A2 | 9/2011 |
| GB | 2 458 677 A | 9/2009 |
| GB | 2 470 478 A | 11/2010 |
| JP | 4-108343 U | 9/1992 |
| JP | 2009-240116 A | 10/2009 |
| JP | 2011-246114 A | 12/2011 |

OTHER PUBLICATIONS

Combined Search and Examination Report, Application No. GB1216128.7, Jan. 14, 2013, 7 pages.
Notice of Reason(s) for Rejection, Japanese Patent Application No. 2015-530458, Mar. 29, 2016, 9 pages.

* cited by examiner

METHOD FOR CONTROLLING AN ELECTRICAL SYSTEM IN A VEHICLE

RELATED APPLICATIONS

This application is a 35 U.S.C. §371 national stage application of PCT Application No. PCT/EP2013/068857, filed on Sep. 11, 2013, which claims priority from Great Britain Patent Application No. 1216128.7, filed on Sep. 11, 2012, the contents of which are incorporated herein by reference in their entireties. The above-referenced PCT International Application was published in the English language as International Publication No. WO 2014/041043 A2 on Mar. 20, 2014.

FIELD OF THE INVENTION

This invention relates to method for controlling an electrical system in a vehicle using switches, and in particular to a method for controlling a dual battery power supply system. Aspects of the invention relate to a method, to system and to a vehicle.

BACKGROUND

Due to concerns over fuel use, it has become imperative for automotive manufacturers to adopt an ecologic mindset. In this mindset efficiency plays a predominant role when developing new vehicle systems. A new car must waste as little fuel as is practical, hence increasing the mileage that the car achieves, and so reducing the cost of running the vehicle and its environmental impact.

One particular feature that can be introduced to minimize the use of fossil fuels is a stop start system. A stop start system automatically shuts down the engine in a car when it is not in use, and starts it again as soon as it is required. The shutdown in a stop start system is not a full shutdown, but a partial shutdown which allows the engine to restart promptly when needed. By using a stop start system when a car is idling, for example at traffic lights, fuel consumption can be reduced. Similar systems are frequently used in hybrid vehicles, where they can be used even if the car is not stationary. For example, the internal combustion engine may not be employed during low power uses of the vehicle and while the high voltage battery system has sufficient power to drive the vehicle. A stop start system can also be used in purely internal combustion engine driven vehicles to conserve fuel during stationary idling.

One major problem which must be overcome in a stop start vehicle is how to imperceptibly re-crank the engine, starting the engine again when it is required. Re-cranking the engine requires considerable power from the primary battery in the car, typically a 12 volt battery, and as such re-cranking can cause a drop in the voltage available to other systems. This can cause control modules to reset and other faults to arise. If a vehicle is completely shut down before start up, (eg when an ignition system is disabled) these problems do not arise since any fault codes which arise due to a voltage drop during the initial crank are not logged. These fault codes can be safely ignored since the initial crank is not a safety critical scenario. However once the vehicle has been driven, and during a re-crank, similar errors cannot be ignored. Therefore many systems in the vehicle require a reliable voltage to continue functioning, and to prevent inaccurate faults being logged. These systems may include control components, and in particular engine management systems require a reliable voltage and will generally go into shut down when a predetermined voltage reduction has occurred. Since several of the electrical systems in a car are safety critical, it is vital that a reliable voltage is provided. Safety critical systems include some braking systems, stability control etc. If the car is a hybrid it may still move while the engine is turned off, and steering systems may therefore be safety critical as well.

It is also important to perform a re-crank without an audible or visible drawback for the driver, such as the lights dimming, or the volume of a radio dropping, or any similar effect.

To tackle this issue, a new hardware layout has been designed in which two batteries, typically 12V each, are connected in parallel. International patent application PCT/EP2012/051484 describes one such system. In a two battery system, the auxiliary battery can be used to support control modules and other systems while the main battery is used to re-crank the engine. This requires a control system that isolates the main battery from the vehicle systems during re-crank, otherwise the effect of two batteries may be lost.

In a conventional vehicle with a stop start system, the auxiliary battery is only used briefly, during a re-crank. It is desirable that the auxiliary battery is not cycled significantly, so that it lasts a long time before requiring replacement.

In a hybrid vehicle, in contrast, it is typically desirable to isolate the main battery from the remainder of the electrical system for as long as the internal combustion engine is turned off. Hence the 12V auxiliary battery is used whenever the hybrid is in an electric mode, relying upon a high voltage battery driven motor rather than an internal combustion engine. Hybrid vehicles often have at least three batteries, two of which are 12V batteries and one of which is a 300V battery.

It is suggested in PCT/EP2012/051484 to isolate the auxiliary battery during normal operation to avoid this cycling problem, and this is achieved by a switch which isolates the auxiliary battery from the other electrical components of the vehicle. However, it is necessary to keep the auxiliary battery at full charge to avoid deterioration, and to ensure that the battery is ready for use by the stop start system.

Typically, the battery in a conventional vehicle is monitored for its condition via signals obtained from a Battery Monitoring System (BMS), which measures the battery temperature, battery voltage and battery current. With this information, the BMS derives the battery's State Of Charge (SOC), so that the battery can be charged as necessary.

However, managing these two batteries, which are typically arranged in parallel with each other and with the other components of the electrical system in the vehicle, is not a trivial problem. The need to keep each battery charged and in good working order must continuously be balanced with the power consumption needs of the vehicle's electrical systems.

BRIEF SUMMARY OF THE INVENTION

In accordance with one aspect of the present invention there is provided a method for controlling an electrical system in a vehicle. The electrical system comprises: at least a first switch and a second switch arranged such that operating the switches will isolate parts of the electrical system controlled by said switches; and a control unit, the control unit being arranged to operate the switches. The method comprises: putting the control unit into a first operational mode, the first operational mode comprising at least a first arrangement of switches; receiving a request in the control unit to enter a second operational mode, the second operational mode comprising at least a second arrangement of switches; determining the priority of the first and second operational modes at least in part by consulting a database of operational modes and their priorities; switching the control unit into the second operational mode if the second operational mode has a higher priority than the first operational mode or when the first operational mode ceases; and continuing in the first operational mode otherwise.

In this way the method provides an easily expandable control method for the electrical systems in the vehicle. It may be that an operational mode is associated with more than one arrangement of switches, and that the method comprises changing between arrangements of switches while in an operational mode. The method can handle switching between as many operational modes as is necessary, and a new operational mode can be introduced simply by associating the operational mode with one or more arrangements of switches and providing any necessary priority information. Priorities can be used to ensure that the vehicle will assume the correct operational mode in any given situation, and in particular that safety critical operational modes are always given priority over other operational modes. The method can also be expanded to handle as many additional switches as is required, so that multiple different components can be isolated from one another when necessary.

The use of at least first and second switches in the invention is advantageous since, by using a plurality of switches, separate sections of the electrical system can be preferentially isolated. This can be used to prevent unwanted charging or discharging of batteries, for example, by isolating a battery from the system without needing to isolate additional components. In a two battery system the method according to the invention can be used as part of a state of charge test such as the one described in detail below.

The database comprises a list of operational modes, each operational mode being associated with a value which represents the priority of that operational mode. Hence the first operational mode can be compared to the second operational mode by comparing the values of their respective priorities.

The switches may be electronic switches. The electrical system may be a dual battery power supply system.

The method may comprise: operating in the second operational mode for an operational period; and switching the control unit into the first operational mode when the operational period has finished. The operational period may be predetermined for an operational mode, or it may vary depending upon the state of the vehicle.

The method may comprise: assigning an operational period to the second operational mode, the operational period comprising a period of time in which the second operational mode can operate; and switching the control unit into the first operational mode when the operational period has finished.

In this way an interrupted operational mode can resume once a higher priority operational mode has completed its operation. The operational period may be preset for the second operational mode, or the request for the second operational mode may include a request for a particular length of operational period, the length of the operational period being determined by the request. Hence the operational period may be assigned for example as part of the operational mode, or by a controller unit.

Where an operational period is used, the method may comprise receiving a request to enter a third operational mode while in the second operational mode, the third operational mode comprising at least a third arrangement of switches; determining the priority of the first and third operational modes at least in part by consulting a database of operational modes and their priorities; and switching the control unit into the third operational mode when the operational period has finished, if the third operational mode has a higher priority than the first operational mode.

The method may comprise receiving a request to enter a third operational mode while in the second operational mode, the third operational mode comprising at least a third arrangement of switches; determining the priority of the second and third operational modes at least in part by consulting a database of operational modes and their priorities; and switching the control unit into the third operational mode immediately, if the third operational mode has a higher priority than the second operational mode.

As such the control unit can be put into a third operational mode even if the second operational mode is still operational. This allows a high enough priority mode, such as a safety critical mode, to override another mode, even if the other mode is still within an operational period.

Where the third operational mode replaces a second operational mode, and where the third operational mode is associated with a third operational period, it may be that the method comprises returning to the first operational mode once the third operational mode is completed. In this way the second operational mode is effectively terminated when switching into the third operational mode, such that the second operational mode must be requested again if it is to proceed. Alternatively, it may be that the method comprises returning to the second operational mode once the third operational mode is completed. In this way the second operational mode is effectively suspended, and resumed once the third operational mode is completed. Where the second operational mode is associated with a second operational period, the second operational period may be reset once the second operational mode is resumed. Alternatively, the second operational period may continue from where it left off, such that the length of time spent in the second operational mode is not changed for the second operational mode being interrupted.

It may be that the second operational mode cannot be replaced with a third operational mode when the second operational mode is operational, at least unless the third operational mode has a priority greater than a predetermined minimum, where the priority of the predetermined minimum is higher than the priority of the second operational mode. This can help to prevent mode switching unless absolutely necessary, and so prevent "stuttering", where the system rapidly switches between modes as new requests are received, without any given mode being able to complete its operation, while also allowing high priority modes, such as safety critical modes, to execute immediately.

It may be that the priority of at least the second mode increases with time after a request for the second mode has been made, if the second mode is still not operational. In this way, if the second mode does not become operational, its priority will rise until it is high enough for the second mode to operate, ensuring that the second mode is used eventually. The priority of the second mode may stop rising once it reaches a predetermined maximum.

Typically, the electrical system will comprise at least one battery. It may be that the electrical system comprises a main battery and an auxiliary battery, the first switch being arranged such that operating the first switch will isolate the auxiliary battery from at least one component within the electrical system, such as sensitive electrical loads.

It may be that the priority of at least the second mode is determined at least in part by the request. Where the request is triggered by a particular event or series of events, it may be that the priority of at least the second mode is determined at least in part by the trigger for the request.

It may be that the request includes a factor relating to the urgency of the request, which fact serves to alter the priority of the second mode as retrieved from said database. It may be that said factor relates to the state of charge of the auxiliary battery.

It may be that the second operational mode comprises a fourth arrangement of switches, the method comprising the electrical system switching between the second arrangement of switches and the fourth arrangement of switches while the second operational mode is operational. The method may comprise switching between the fourth arrangement of switches and the second arrangement of switches while the second operational mode is operational.

The first, second, third, and fourth arrangements of switches may all be different, or some of them may be identical. Any operational mode may comprise any necessary arrangement of switches or combination of arrangements of switches.

According to another aspect of the invention there is provided an electrical system for use in a vehicle, the electrical system comprising: at least a first switch and a second switch arranged such that operating the switches will isolate a part of the electrical system; a control unit, the control unit being arranged to operate the switches; and a database of operational modes and their priorities, said operational modes comprising at least different arrangements of said switches, the control unit being arranged to control the electrical system according to any of the methods described above.

It may be that the electrical system comprises a main battery and an auxiliary battery, the first switch being arranged such that operating the first switch will isolate the auxiliary battery from at least one component within the electrical system.

The invention also provides a vehicle comprising an electrical system as described above.

According to a further aspect of the present invention there is provided a vehicle comprising an electrical system having the following components: an internal combustion engine; a main battery to power a starter motor for the engine; an electrical load; a generator; an auxiliary battery; first and second switches connected to the main and auxiliary batteries respectively to selectively connect the main and auxiliary batteries to the electrical load; and a control unit. The control unit is adapted to operate the switches between different operational modes of the electrical system, which operational modes have different relative priorities assigned at least in part by a database of said operational modes and their priorities. The control unit may be adapted: to put the electrical system into a first operational mode, the first operational mode comprising at least a first arrangement of switches; receive a request to enter a second operational mode, the second operational mode comprising at least a second arrangement of the switches; determine the priority of the first and second operational modes at least in part by consulting the database; switch the control unit into the second operational mode if the second operational mode has a higher priority than the first operational mode or when the first operational mode ceases; and continue in the first operational mode otherwise.

It may be that said operational modes are selected from the group comprising:
said main battery being connected to said electrical load and said auxiliary battery being isolated therefrom, being a normal-driving operational mode;
said main battery being connected to said starter motor and said auxiliary battery being connected to said electrical load, being an engine-starting operational mode during stop start operation of the vehicle;
said main battery being connected to said electrical load and said auxiliary battery being connected to the generator, being an auxiliary-battery-charging operational mode;
a sequence of connections, in which:
first, said main battery is connected to said electrical load and the auxiliary battery is disconnected therefrom, a first current drain on the first battery being measured, and
second, said main battery and the auxiliary battery is connected to said electrical load, a second current drain on the first battery being measured,
whereby the charge of the auxiliary battery may be estimated.

One operational mode of a method as described above, or in an electrical system as described above, may comprise a method and system for determining the state of charge in a battery. The method comprises providing a main battery and an auxiliary battery. The method then comprises connecting the main battery to an electrical load; measuring $I_1$, the current drawn from the main battery while it is connected to the electrical load; connecting the auxiliary battery in parallel with the main battery and the electrical load; measuring $I_2$, the current drawn from the main battery while it is connected to the electrical load and the auxiliary battery; and estimating the state of charge in the auxiliary battery based upon at least the difference between $I_1$ and $I_2$.

In this way the method estimates the state of charge of the auxiliary battery from the magnitude of a discharge current from that battery. The state of charge in the auxiliary battery can therefore be estimated without having to take direct measurements from the auxiliary battery. Instead, the estimate can be derived using only equipment, such as a Battery Monitoring System (BMS), which is attached to the main battery. No dedicated monitoring equipment needs to be attached to the auxiliary battery, therefore avoiding the expense of a second BMS, or a dedicated current sensor. In addition, the electrical load is provided with power throughout, meaning that electrical systems within a vehicle employing such a method will continue to operate, including safety critical systems such as braking systems. The method may be used in a vehicle, wherein the vehicle comprises the main battery, the auxiliary battery and the electrical load.

One major advantage of this method is that the performance of the battery is being examined under the load. This means that the test can be carried out during normal operation of a car incorporating the system. Since the results of the method are not safety critical and a failure will typically cause only a charging cycle for the battery, a successful pass of the test indicates robustly that the battery is capable of providing a power supply when required.

It may be that the method comprises: taking a plurality of measurements of $I_1$ and $I_2$; and deriving a plurality of estimates of the state of charge in the auxiliary battery using the plurality of measurements of $I_1$ and $I_2$.

As the size of the electrical load may vary with time, it may change between the measurement of $I_1$ and the measurement of $I_2$. Performing multiple checks can help to compensate for this source of error. The method may comprise taking an average of the plurality of the estimates of the state of charge, and using the average state of charge to determine if the auxiliary battery needs to undergo a charging cycle.

The method may comprise classifying each estimate of the state of charge as indicating either that the battery is above a predetermined threshold charge or that the battery is below that threshold charge. The method may then comprise charging the battery once a predetermined number of estimates indicate that the battery is below the threshold charge. The method may also or alternatively comprise ending the method once a predetermined number of estimates indicate that the battery is above the threshold charge.

It may be that the method comprises: determining the temperature of the main battery; and estimating the state of charge in the auxiliary battery based upon at least the difference between $I_1$ and $I_2$, and the temperature of the main battery.

Similarly, it may be that method comprises: determining the temperature of the auxiliary battery; and estimating the state of charge in the auxiliary battery based upon at least the difference between $I_1$ and $I_2$, and the temperature of the auxiliary battery.

In this way the method estimates the state of charge of the auxiliary battery from the magnitude of a discharge current from that battery with respect to known conditions such as temperature. Determining the temperature of either battery may comprise measuring the temperature directly using a sensor such as a thermistor. Alternatively, determining the temperature of the either battery may comprise using a thermal model to calculate an estimated temperature. The estimated temperature may be based upon variables such as the temperature in other locations in the vehicle, the ambient temperature, and how long the car has been operating. In a particular embodiment, the temperature of the main battery may be measured by a BMS, and the temperature of the auxiliary battery may be estimated using a thermal model.

The method may comprise initiating a charging cycle for the auxiliary battery if the estimated state of charge in the auxiliary battery is beneath a predetermined level.

The method may comprise: first determining the size of the electrical load; and interrupting the method if the electrical load is beneath a predetermined threshold load. Once the method has been interrupted, the method may comprise restarting the method if the load rises above a predetermined threshold. Alternatively, the method may comprise: first determining the size of the electrical load; and increasing the size of the electrical load if it is beneath a predetermined minimum.

The method may comprise: determining the size of the electrical load while carrying out the method; and interrupting the method if the electrical load exceeds a predetermined maximum.

The size of the electrical load may be determined by a direct measurement, or it may be estimated, for example by identifying which electrical systems are active, and deriving an estimate based upon each system's typical electrical load.

The method may comprise deactivating a third power source while the measurements are made, such as an alternator or a DC/DC converter, in order that the third power source does not alter the electrical characteristics of the vehicle in unpredictable ways. As well known, an alternator is employed in vehicles with internal combustion engines to charge batteries and a DC/DC converter is used especially in hybrid vehicles where the electric motor may be running at a higher voltage than normal vehicle systems and the power source is set up accordingly. In addition, deactivating the third power source may serve to increase the current draw from the main battery and the auxiliary battery, which will tend to make the results of the method more reliable.

The method may comprise: providing a table which relates the difference between $I_1$ and $I_2$ with the state of charge in the auxiliary battery; and using the table to estimate the state of charge in the auxiliary battery.

Alternatively, $I_1$ and $I_2$ may be related to the state of charge in the battery by an equation.

The method may comprise: calculating the current contribution ratio C, where $C=I_2/(I_1-I_2)$; and estimating the state of charge in the auxiliary battery based upon at least the value of C.

Estimating the state of charge in the auxiliary battery may comprise comparing C to a threshold value of C.

Also described is a method of calibrating a table used in the method described above, the calibration method comprising: not charging or discharging the auxiliary battery for a predetermined period of time; measuring the voltage across the terminals of the auxiliary battery; estimating the state of charge in the auxiliary battery based upon at least the voltage across the terminals; estimating the state of charge in the auxiliary battery using a method as described above; comparing the two estimates; and amending the table so that the two estimates are the same.

Where an equation is used instead of a table, the equation can be calibrated by: not charging or discharging the auxiliary battery for a predetermined period of time; measuring the voltage across the terminals of the auxiliary battery; estimating the state of charge in the auxiliary battery based upon at least the voltage across the terminals; estimating the state of charge in the auxiliary battery using a method as described above; comparing the two estimates; and amending at least one constant in the equation so that the two estimates are the same.

In either of the two calibration methods described above, the auxiliary battery may be isolated from other electrical components such as the load while the voltage across the terminals of the auxiliary battery is measured. This can help to prevent charging or discharging of the battery which might change the result.

There is also provided a power management system which comprises: a control unit; a main battery; and an auxiliary battery. The control unit is arranged to estimate the state of charge of the auxiliary battery using a method as described above. The control unit may be an existing power supply control unit. In this way, the invention can be implemented on an existing hardware platform, without the need for additional components.

It may be that the control unit comprises a memory, and the memory comprises a table which relates the difference between $I_1$ and $I_2$ with the state of charge in the auxiliary battery.

Alternatively, the memory may comprise an equation which relates the difference between $I_1$ and $I_2$ with the state of charge in the auxiliary battery.

It may be that the control unit is arranged to calibrating the table or equation using a method as described above.

The invention also provides a vehicle which employs a method as described above and/or comprises a power management system as described above.

There is therefore provided a vehicle comprising an electrical load and main and auxiliary batteries independently connectable by a control unit to the electrical load and means to measure the current (I) drawn by the electrical load from the main battery, wherein the control unit is arranged to connect the main battery to the electrical load, determine $I_1$, the current drawn from the main battery while it is connected to the electrical load, connect the auxiliary battery in parallel with the main battery to the electrical load, measure $I_2$, the current drawn from the main battery while it is connected to the electrical load and the auxiliary battery, and estimate the state of charge in the auxiliary battery based upon at least the difference between $I_1$ and $I_2$.

In an embodiment, the vehicle incorporates an internal combustion engine and has a stop start mode of operation whereby the main battery is employed to start the engine and operate the vehicle electrical load while the engine is running and the auxiliary battery is employed to operate the vehicle electrical load while the engine is being started by the main battery during said stop start mode of operation, wherein said control unit is arranged to estimate the state of charge of the auxiliary battery while the engine is running. The vehicle may be a hybrid electric vehicle. Where the vehicle is a hybrid electric vehicle, the auxiliary battery may be used while in any electric vehicle mode.

The control unit of the vehicle may be arranged to perform the method steps described above.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
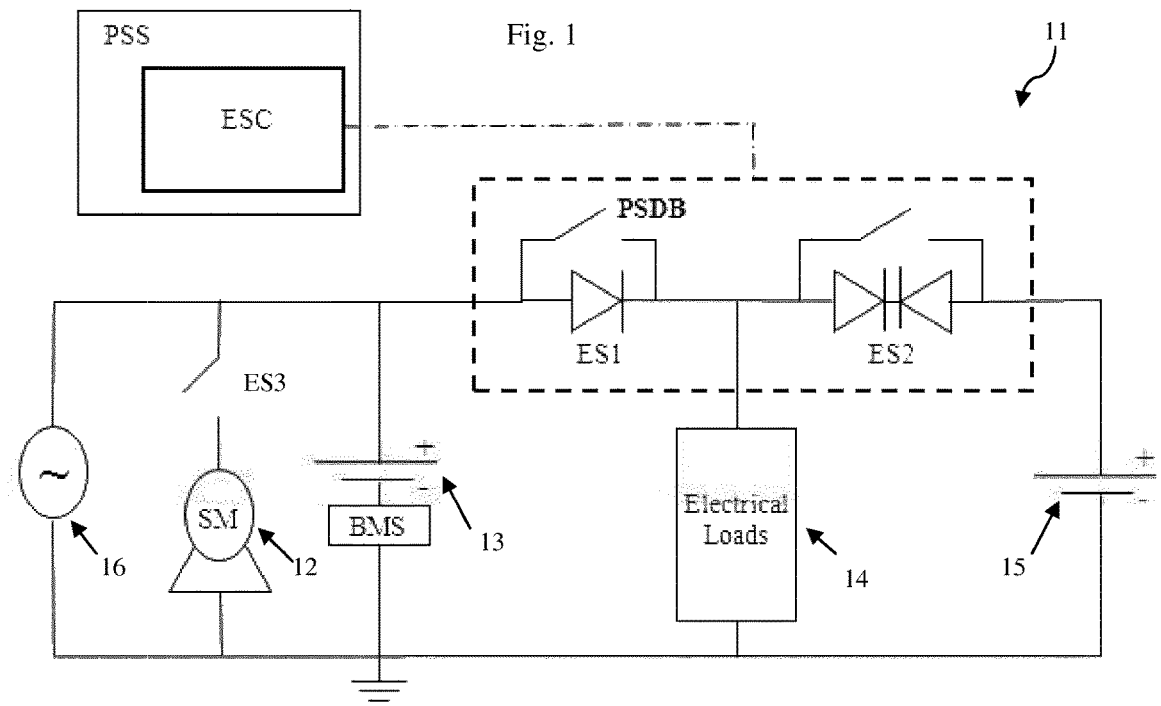
FIG. 1 is a diagram of part of the electrical system in a car fitted with a stop start system.
Figure 2:
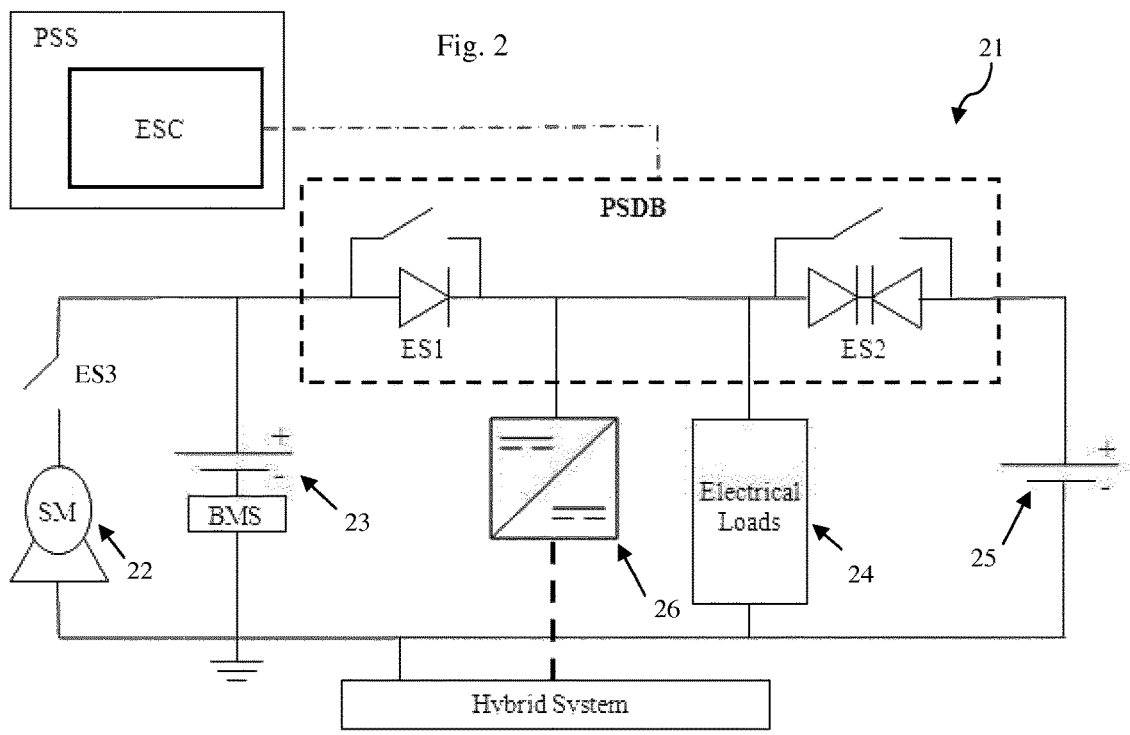
FIG. 2 is a diagram of part of the electrical system in a hybrid electric car.

FIG. 1 and FIG. 2 are diagrams of the electrical systems in two different types of vehicle. FIG. 1 shows the electrical system 11 in a conventional car which is equipped with a stop start system. FIG. 2 shows the electrical system 21 in a hybrid car. Both the conventional car and the hybrid comprise a starter motor 12, 22, a main battery 13, 23, various loads such as the engine management system, windscreen wipers etc 14, 24, and an auxiliary battery 15, 25, all of which are arranged in parallel. Both of the main batteries 13, 23 are provided with Battery Monitoring Systems (BMS). The conventional car comprises an alternator 16, which can provide power to the system when the internal combustion engine is running. The hybrid car comprises a DC/DC converter 26 which receives power from the electric motor/generator (not shown) and a high voltage battery (not shown). The DC/DC convertor 26 charges the batteries 23, 25. Each system also comprises three switches, ES1, ES2 and ES3, which can be used to isolate components from one another when necessary.

Although the conventional car and the hybrid car are equipped with similar dual battery power supply systems, the operation of the switches ES1, ES2 and ES3 and the use of auxiliary batteries 15, 25 are very different. Although the hybrid car can stop and start the engine to save fuel, it is also equipped with an electric motor suitable for propelling the vehicle at low speeds. Also, the DC/DC converter 26 is capable of supporting the electrical loads 24 while the internal combustion engine of the hybrid car is turned off, which an alternator 16 cannot do.

Both the main and auxiliary batteries 13, 23, 15, 25 are typically 12V lead acid batteries.

Figure 3:
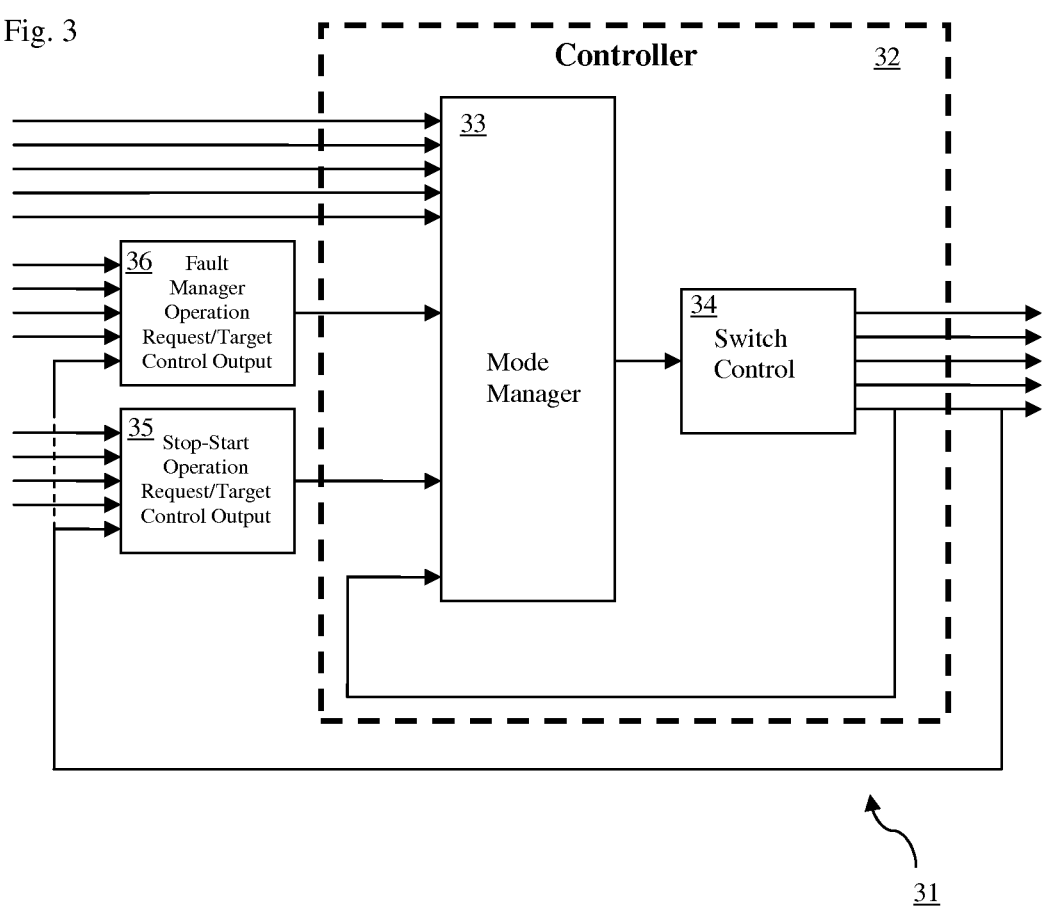
FIG. 3 is a diagram showing the high level functionality of software in a control unit which can be used to control an electrical system.

FIG. 3 is a diagram showing the high level functionality of software in a control unit 31 which can be used to control an electrical system such as the electrical systems 11, 21 shown in FIG. 1 and FIG. 2. The control unit 31 must dynamically alter the network configuration of the electrical system 11, 21 in order to allow all the different system functions to be executed in the correct manner.

To achieve this objective, the control unit 31 comprises a controller 32, which is able to operate the switches ES1 and ES2. The third switch, ES3, is not directly controlled by the controller 32. However, the controller 32 is able to give start permission to the starter motor, enabling the third switch ES3 to operate. The controller 32 can therefore switch various components in and out of the electrical network by operating ES1 and ES2. The controller 32 is provided with two software routines; the mode manager 33, and the switch control 34. The mode manager 33 and the switch control 34 operate in concert to select the correct configuration of ES1, ES2 and ES3.

The mode manager 33 and the switch control 34 comprise various software sub functions. For purposes of clarity, only two example sub functions are illustrated in FIG. 3. These are the stop start sub function 35 and the fault manager sub function 36.

Each sub-function is excited by an external operation request which, in turn, is raised according to a set of internal and external triggers. The triggers for a sub function can be real life variables such as sensor data, calculated parameters within the broader control functionality, or feedback signals from the controller 32 itself. All these together determine when a sub function can or should be executed.

Turning to FIG. 1, during a stop start sub function 35, as the vehicle stops ES1 would be closed and ES2 and ES3 open so that the electrical load 14 can still draw power from the main battery 13. This is necessary since the stop in a stop start sub function is not a full shutdown, and various electrical systems within the car will need a continuous supply of power. Then, as the vehicle prepares to start again, ES2 is closed and ES1 is opened so that the electrical load 14 can draw power from the auxiliary battery 15. At the same time, or shortly afterwards, ES3 is closed so that the main battery 13 can supply power to the starter motor 12 to restart the vehicle's engine.

The fault manager sub function 36 is activated when a fault is detected within the vehicle, especially a fault with the electrical systems. For example, if a severe fault is detected with the auxiliary battery 15, 25, then the fault manager sub function 36 may cause ES2 to open and remain open, while the vehicle continues to operate without using the auxiliary battery 15, 25 in any way. In this condition, any stop-start or hybrid functionality will be suspended.

Many other sub functions are possible and may be necessary. For example, a sub function may be provided to check on the state of charge of the auxiliary battery 15, 25. Similarly, a sub function may be provided to charge the main battery 13, 23 or the auxiliary battery 15, 25, from the alternator 16 or the DC/DC converter 26.

Turning to FIGS. 1 and 2, the cars may be provided with an off mode to function in whilst the car is shut down. As the off mode starts, an off sub function operates in the controller 32. When the off sub function is operated, ES1 and ES2 are opened as a part of the shutdown process. The diodes illustrated in the figures provide a route for quiescent current drain as necessary. Typically, the OFF mode follows naturally from the design of the switches; as the vehicle is turned off, the power to control the switches is lost and the switches open automatically.

However, a driver may wish to use systems in the car, such as the radio, while the engine and most of the car's systems are still turned off. Therefore an accessory mode is provided. In the accessory mode, an accessory sub function operates and closes ES1 whilst keeping ES2 open. Power is then provided to the electrical loads from the main battery via ES1, so that devices such as the radio can operate.

Turning to FIG. 2, and the hybrid car, when the ignition is operated to start the car, different ignition modes can be selected. In a first ignition mode, the vehicle is started in the same manner as the vehicle illustrated in FIG. 1.

Alternatively, the car may be started in an Electric Vehicle (EV) mode, where torque is provided to the wheels by an electrical motor. Subsequently, when the vehicle is already moving, a second ignition mode may be used, in which the clutch is engaged and the engine is "push" started by the vehicle's momentum. In the second ignition mode, a second ignition sub function operates and ensures that ES1 is closed and ES2 is open. In this mode, the DC/DC converter 26 can provide power for the load 24, as well as for charging the main battery 23. If the car is not moving fast enough or if for any other reason a "push start" is not possible, the starter motor will be used to crank the engine. This is done with ES1 open and ES2 closed, the latter allowing power to flow from the auxiliary battery into the loads. During this time, the DCDC will also support the loads.

In a third ignition mode, which may be useful in cold climates when more power is needed to start the internal combustion engine, both ES1 and ES2 may be closed so that the starter motor can draw current from both batteries when starting the engine. A vehicle which is expected to use the third ignition mode is typically provided with a larger auxiliary battery in expectation of its use in helping to start the engine.

Once ignition is complete, the hybrid car may enter a first engine running mode, in which a first engine running sub function operates and ensures that ES1 is closed and ES2 is open. Therefore the car's electrical load 24 is powered by the main battery 1 and the DC/DC converter 26, while the auxiliary battery 25 is kept disconnected in order to ensure it remains fully charged and ready for use.

If it is determined that the auxiliary battery 25 needs to be charged, then the hybrid car may enter a second engine running mode, in which a second engine running sub function operates and ensures that ES2 is closed and ES1 is also closed. The DC/DC converter then operates so that it charges the auxiliary battery 25 and provides power for the electrical load 24.

The software referred to as the mode manager 33 administers the operation of the sub functions, deciding which sub functions are used. The length of time for which each sub function is used is determined by the sub function itself, subject to any higher priority sub function interrupting. The switch control, in contrast, is very simple software. Its only job is to output the desired control targets, by operating the switches ES1 and ES2, as well as the switch ES3 indirectly. The control targets are task specific and their execution depends on the mode manager's permission to run.

Requests for sub functions can conflict, since different sub functions require different configurations of the switches ES1, ES2, ES3. Where more than one sub function has been requested, the mode manager 33 may therefore need to decide which sub function to execute.

For example, if the system is executing a stop start function, and a battery fault is detected, triggering a request for the fault manager sub function 35, the fault manager sub function 35 would have to be high priority in such a case. This priority is to set the system in order to prevent damage to its components, whilst still allowing the car to be safely driven. However, since the stop start functionality is already in execution, the controller 32 will need to wait until it is reasonable to change sub function without interrupting the operation of the vehicle.

In order to arbitrate between different sub functions, the mode manager 33 uses a priority which is assigned to each sub function. The priority of the sub functions is preset. Sub functions are then issued a token according to their priority. The token represents permission for the sub function to operate, and to dictate the arrangement of the switches ES1, ES2, and indirectly of switch ES3. The sub function operates until the task it is intended to facilitate is complete, unless it is interrupted by another, higher priority, sub function.

The mode manager 33 comprises a priority table, which determines at least a part of the priority of each sub function. This priority table lists all the possible sub functions associated with controlling the electrical flow between the 12V batteries, the electrical loads, and an alternator or DC/DC converter in a vehicle and assigns them a priority.

It may be that the token for a sub function can be withdrawn or reassigned. For example in the event that a trigger occurs for a sub function with a high enough priority, the mode manager 33 can interrupt the presently executing sub function and assign a token for immediate use to the high priority sub function. For example, in the case of a serious fault, the fault manager sub function 35 may be requested with a high enough priority to be given an immediate token and interrupt another operating sub function, such as the sub function for charging the main battery 13, 23 from the alternator 16 or DC/DC converter 26.

Typically, if it is reasonable to do so, the highest priority function will execute immediately. Otherwise it will wait until it is safe to change operation mode.

Table 1, below, is a table showing an example set of sub functions and their priorities according to an embodiment of the invention in a hybrid vehicle. Table 1 is therefore a part of a database as could be used in an embodiment of the invention. The set of sub functions shown is only a partial set, and more sub functions would typically be required for the successful operation of a vehicle.

TABLE 1

| Calibratable | Value | Range | Res. | Description |
|---|---|---|---|---|
| ColdClimFcnFlg_Pt | 1 | [0, 100] | 1 | Engine crank request at cold climate |

TABLE 1-continued

| Calibratable | Value | Range | Res. | Description |
|---|---|---|---|---|
| ManCrnkFcnFlg_Pt | 2 | [0, 100] | 1 | Manual Engine crank request by driver |
| ForcedEngManualCrnkFlg_Pt | 3 | [0, 100] | 1 | Engine crank request from first take off |
| FaultFlg_Pt | 4 | [0, 100] | 1 | System fault occurrence |
| Batt2InCirctDiagFlg_Pt | 5 | [0, 100] | 1 | Battery in circuit diagnostic request |
| Batt2ChrgFlg_Pt | 6 | [0, 100] | 1 | Battery 2 charging request |
| Batt2SoCEstFlg_Pt | 7 | [0, 100] | 1 | Battery 2 State of charge estimation request |
| EVModeFlg_Pt | 8 | [0, 100] | 1 | EV mode request |
| StopStartFcnFlg_Pt | 9 | [0, 100] | 1 | TSS Stop start operation |
| DfaltPostn_Pt | 50 | [0, 100] | 1 | Default switch position acceptance |

The values in the column labelled "Calibratable" are the names of the various sub functions, and a description for each sub function is provided in the column labelled "Description". The priority of each sub function is indicated by the "Value" column, wherein a lower value indicates a higher priority. So the sub function ColdClimFcnFlg_Pt, which executes when a request for an engine crank is received while the external temperature is beneath a predetermined minimum, has a value of 1. Therefore ColdClimFcnFlg_Pt has the highest priority of any sub function and will execute whenever it is requested. Due to the nature of the sub function, ColdClimFcnFlg_Pt will only actually run if the vehicle is coming from a shut down status into a start up status.

DfaltPostn_Pt is the default switch position. EVModeFlg_Pt is used when the vehicle is operating in an EV mode, with the internal combustion engine turned off and torque being provided to the wheels by an electric motor. If a request for EVModeFlg_Pt is received while in DfaltPostn_Pt, then EVModeFlg_Pt will execute immediately. Similarly, if a request for Batt2ChrgFlg_Pt, which is used to charge the auxiliary battery, is received while in EVModeFlg_Pt, then EVModeFlg_Pt will be interrupted so that the auxiliary battery can be charged in Batt2ChrgFlg_Pt. Before changing modes an engine re-crank would be requested and once it was detected the engine was running, the mode could then be changed.

Electrical systems in modern vehicles are typically very complex. The tendency is for this complexity to increase as new functions are introduced, and as rules and regulations become more stringent. Treating each sub function as a single entity makes it very easy to expand the number of functions or even alter their priority in relation to each other. The controller 32 can take account of a new sub function easily, so long as the new sub function is assigned a priority in the priority table, and any other relevant information is provided for the mode manager 33. These easy changes also make it straightforward to adjust the controller 32 to optimise its behaviour.

Figure 4:
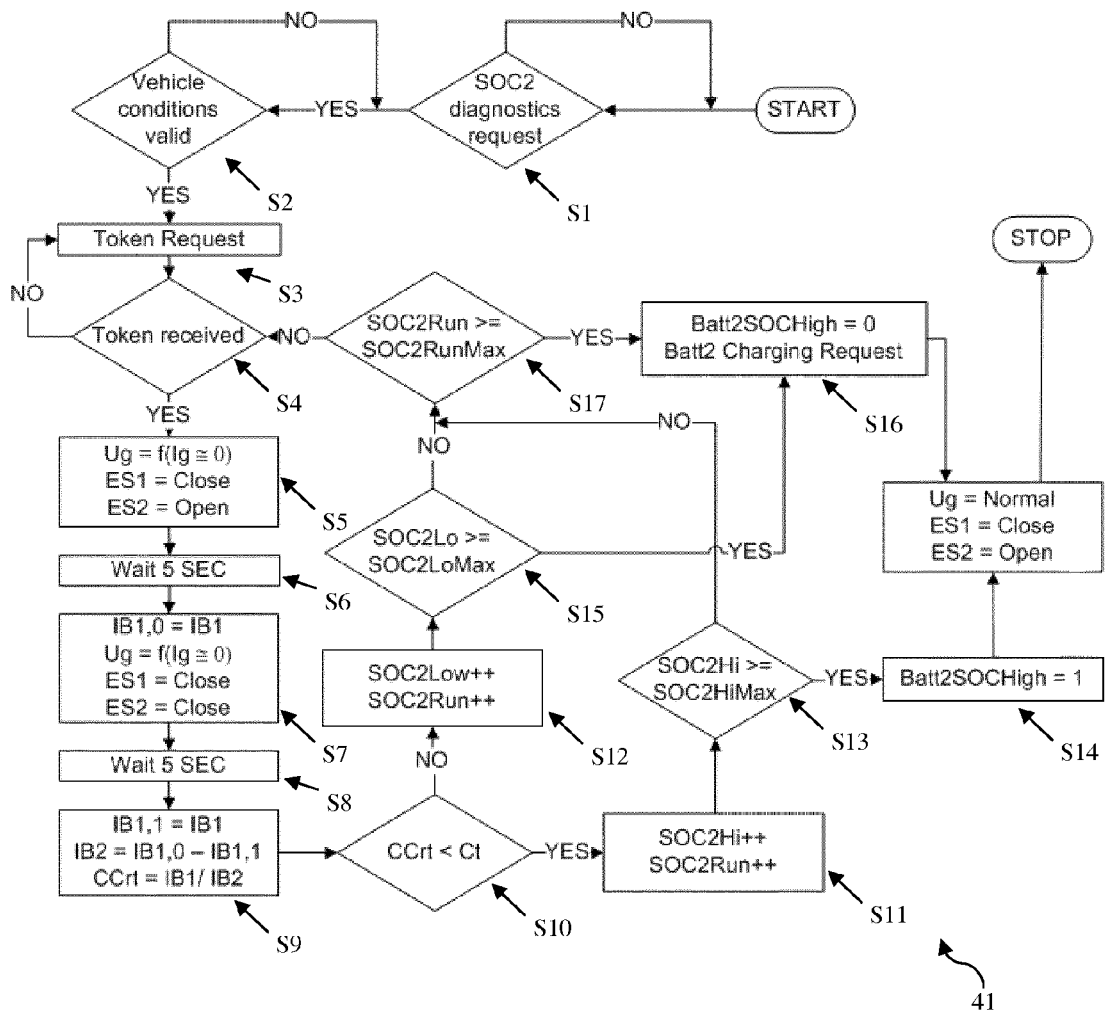
FIG. 4 is a flow chart showing a method of determining the state of charge in a vehicle.

FIG. 4 is a flow chart showing how a particular sub function is performed.

Typically, the battery in a conventional vehicle is monitored for its condition via signals obtained from a Battery Monitoring System (BMS), which measures the battery temperature, battery voltage and battery current. With this information, the BMS derives the battery's State Of Charge (SOC), so that the battery can be charged as necessary.

For a car with two batteries, the attributes of the auxiliary battery also require measurement if the battery is to be used properly. In particular, the performance of the auxiliary battery (and in turn the performance of any system which relies upon the auxiliary battery during a re-crank) depends upon the auxiliary battery's SOC. For this reason another BMS module, attached to the auxiliary battery, can be utilised to determine the SOC. However, BMS modules are expensive, and fitting an additional one increases the cost of manufacture. Therefore, if the estimation of the auxiliary battery SOC could be realised without the use of an auxiliary BMS module, this would result in a cost saving.

After the auxiliary battery 15, 25 has been at rest for a long period of time its SOC can be estimated by measuring the voltage across the battery's terminals. Hence when the car has been turned off for over eight hours, the SOC of the auxiliary battery 15, 25, can be measured directly by a simple voltage measurement. This is known as the passive test.

However, a passive test is of no use while the battery has been recently charged or discharged, since charging and discharging cause a diffusion of the electrolyte, which in turn prevents the voltage from providing a reliable indication of the charge. Therefore, when the vehicle off time is too short to use the voltage which is measured at the battery terminals to estimate the SOC, an alternative method must be employed.

One method uses the current of the auxiliary battery, rather than the voltage, to estimate the auxiliary battery's state of charge. This is known as the active test.

FIG. 4, therefore, is a flow chart showing the active test, which is a process which might be used by the power management system in a vehicle as shown in FIG. 1 to estimate the SOC of the auxiliary battery 15. (The same approach is taken with respect to FIG. 2, but the following description refers only to FIG. 1 unless specified otherwise.)

In a first step S1, the power management system determines that such a test is necessary and submits a request for the test to be carried out. The request is submitted to a controller unit within the power management system which controls the arrangement of the switches ES1, ES2, and therefore controls whether the vehicle can be put into the correct state for carrying out the test. In step S2, the controller unit checks that the conditions are valid for a test to be carried out. If they are valid, then the test proceeds. In steps S3 and S4 a token is issued. The token represents permission for the test to proceed.

Then the alternator 16 is set to a minimal output, usually providing between one and two amps of current, by minimising the excitation current for the magnetic field in the alternator. Although this is not noted in the flow chart, this step is helpful since it increases the current which is subsequently drawn from the batteries, which tends to lead to a more reliable measurement of the charge in the auxiliary battery 15. In step S5, ES1 is closed and ES2 is opened. In this configuration, the main battery 13 is providing all the power for the load 14. As the current is subject to sudden change after the switches are operated, the power management system then waits five seconds (step S6). The power management system then uses the BMS to measure IB1, which is the current being produced by the main battery 13 at this stage. This measurement is recorded as IB1,0.

In step S7, ES2 is closed, so that both the main battery 13 and the auxiliary battery 15 are connected to the load 14.

Again, the power management system waits five seconds (step S8) before measuring IB1 again. This measurement is recorded as IB1,1.

The current contributed by the auxiliary battery, IB2, can then be calculated as:

$$IB2=IB1,0-IB1,1$$

If IB2 is negative, this indicates that the current being drawn from the main battery 13 was reduced when the auxiliary battery 15 was connected. As such, the auxiliary battery 15 has a high enough capacity to contribute usefully to the load.

If IB2 is positive, then this indicates that the current being drawn from the main battery 13 was increased when the auxiliary battery 15 was connected. As such, the auxiliary battery 15 does not have a high enough capacity to contribute usefully to the load.

For example, in steps S5 and S6, when I_LOAD (the current drawn by the load) is 40 A and I_GEN (the current generated by the alternator) is 0 A, then IB1,0=−40 A. Then, when ES2 is closed, the change in IB1 depends on the state of charge of the auxiliary battery. If IB1 drops from −40 A to −60 A then IB2=−40 A−(−60 A)=20 A, which indicates that the auxiliary battery is drawing current from the main battery and charging. Alternatively, if IB1 increases from −40 A to −20 A, then IB2=−40 A−(−20 A)=−20 A, which indicates that the auxiliary battery is discharging.

As such, IB2 is related to the SOC of the auxiliary battery 15, as well as the SOC of the main battery.

However, IB2 also varies depending upon the SOC of the main battery 13. Therefore the power management system calculates the ratio of the currents contributed by the main and auxiliary batteries 13, 15 in step S9. This gives the current contribution ratio, CCrt, which is defined as:

$$CCrt=IB1,1/IB2$$

In step S10, the power management system then compares the ratio CCrt to a threshold ratio Ct. If CCrt is greater than or equal to Ct then this indicates that the state of charge in the auxiliary battery 15 is too low. If CCrt is lower than or equal to Ct, then this indicates that the state of charge in the auxiliary battery 15 is adequate.

The value of Ct depends upon the size of the main battery 13 and the size of the auxiliary battery 15. However these are fixed variables and can be taken into account when designing the car and calibrating the power management system. More problematically, the ideal value for Ct also depends upon the temperature of the main and auxiliary batteries 13, 15. In particular, the internal resistance of each battery increases as the temperature of the electrolyte decreases. Therefore CCrt is related to the state of charge and the temperature of both batteries. As such Ct is variable with respect to the temperature of the batteries 13, 15.

The BMS can provide a temperature for the main battery. The temperature of the auxiliary battery can either be provided by a dedicated temperature sensor or inferred from other known facts about the car.

For example, in the embodiment shown in FIG. 1, the auxiliary battery 15 may be located next to the main battery 13 under the bonnet of the vehicle. As such, the temperature of the main battery 13 serves as an estimated value for the temperature of the auxiliary battery 15. In other designs of vehicle a more complicated calculation may need to be made, based for example on the ambient temperature, the location of the battery in the car, and how long the car has been running.

Once the two temperatures are determined, the appropriate value for Ct can be determined using a map relating temperatures to Ct for batteries with the known characteristics of the main battery 13 and the auxiliary battery 15.

The load 14 in an electrical system such as the one shown in FIG. 1 is subject to change over time. For example, while the power management system is performing the process shown in FIG. 4, the driver may activate heated seats, or heating for the front or rear windscreen, both of which can change the load significantly.

To take account of this source of error, the power management system performs the check several times. As is shown at steps S11 and S12 in FIG. 4, each time the test is run, the power management system increments the counter SOC2 High if CCrt<Ct, and increments the counter SOC2Low if CCrt≥Ct.

Once SOC2High reaches the threshold SOC2HighMax (step S13), this is taken as an indication that the battery is sufficiently charged (step S14). In the example given, the target SOC is an 80% charge, and SOC2HighMax is 3. Therefore, once the power management system receives three cumulative results indicating that the auxiliary battery 15 has at least an 80% charge, it is taken that the auxiliary battery 15 is charged and ready for use.

Similarly, once SOC2Low reaches the threshold SOC2LowMax (step S15), this is taken as an indication that the battery is not sufficiently charged (step S16). In the example given, SOC2LowMax is 3. Therefore, once the power management system receives three cumulative results indicating that the auxiliary battery 15 has less than an 80% charge, it is taken that the auxiliary battery 15 needs to be charged. To charge the auxiliary battery, the alternator 16 is reactivated and connected to the auxiliary battery 15.

The power management system also increments a counter SOC2Run each time CCrt is measured (steps S11 and S12). If SOC2Run exceeds the threshold SOC2RunMax this is also taken as an indication that the battery is not sufficiently charged (step S17).

During the active test, the power management system monitors which other systems are active in the vehicle. If it appears that the load 14 will rise higher than can be safely supplied by the main and auxiliary batteries 13, 15, then the power management system interrupts the active test and reactivates the alternator 16.

The power management system also monitors the state of charge of the main battery 13 during the test. If the state of charge of the main battery 13 falls below a safety threshold, then the test is interrupted and the alternator is used to support the loads. The test can then be re-initialised one the state of charge of the main battery 13 is high again.

Turning to FIG. 2, the auxiliary battery 25 in this figure can be monitored using the method outlined above. The only difference is that it is the DC/DC Converter 26 which is turned off, by setting the duty cycle, rather than an alternator 16.

The power management system in a vehicle can initiate a check of the SOC in the auxiliary battery 15, 25 for a number of reasons. For example, the power management system may be configured to carry out a check after a predetermined period of time has passed since the last such check. Also, the power management system may be configured to perform a check immediately after the auxiliary battery 15, 25 has undergone a charging cycle. In this way the power management system can confirm that the auxiliary battery 15, 25 has been successfully charged.

If a check is performed after a charging cycle, and the auxiliary battery 15, 25 is found not to be charged, then the power management system records this as an unsuccessful charging event and initiates a second charging cycle. This can happen if the load 14, 24 is high during the charging cycle, the load therefore drawing enough current to prevent an effective charging of the auxiliary battery 15, 25. However, an unsuccessful charging cycle can also indicate that the auxiliary battery needs to be serviced or replaced, especially if there are several unsuccessful charging cycles in a row. To this end, the power management system keeps a log of unsuccessful and successful charging events for use in servicing the car. If the number of unsuccessful charging events exceeds a minimum threshold, then a message is displayed to the driver recommending that the auxiliary battery 15, 25 be checked.

Typically a certain minimum load 14, 24 is required to ensure that the power management system can accurately estimate the SOC of the auxiliary battery 15, 25. As such, if the load is too small the power management system may delay estimating the SOC until the load has risen above a predetermined minimum. In an alternative embodiment, if the load is too small then the power management system may activate other power consuming systems in order to raise the load 14, 24 during a test cycle. However this would be unusual, since typically the required load for an accurate estimate of the SOC of the auxiliary battery 15, 25 is close to the engine's base load, that is the minimum load that the engine can create while operational.

The power management system can perform a correction of the estimated state of charge in the auxiliary battery 15, 25 if the car has been turned off for a long enough period of time, typically eight hours. To perform the correction, the power management system performs a passive test, by measuring the voltage across the terminals of the auxiliary battery 15, 25. The power management system then compares the result of the passive test with the last known result of the active test, and uses the result of the passive test if there is any disagreement.

In a further embodiment, the power management system can perform a calibration check if the car has been turned off for a long enough period of time. To perform the calibration check, the power management system first performs a passive test, by measuring the voltage across the terminals of the auxiliary battery 15, 25. The power management system then performs an active test, by disconnecting and connecting the batteries as described above. The passive test is performed first so that the results are not distorted by the discharging which occurs during the active test. The power management system then compares the results of the two tests and calibrates the active test according to the results of the passive test.

As such, the power management system can adapt if the characteristics of the main and auxiliary batteries 13, 23, 15, 25 change as they age.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for controlling an electrical system in a vehicle, the electrical system comprising:
   a first switch and a second switch configured such that operating the first and second switches will isolate parts of the electrical system controlled by said first and second switches; and
   a control unit configured to operate the first and second switches,
   the method comprising:
     putting the control unit into a first operational mode, the first operational mode comprising at least a first arrangement of the first and second switches;
     receiving a request in the control unit to enter a second operational mode, the second operational mode comprising at least a second arrangement of the first and second switches;
     determining a priority of the first and second operational modes at least in part by consulting a database of operational modes and their priorities;
     switching the control unit into the second operational mode if the second operational mode has a higher priority than the first operational mode or when the first operational mode ceases; and
     continuing in the first operational mode otherwise.

2. The method of claim 1, further comprising:
   operating in the second operational mode for an operational period; and
   switching the control unit into the first operational mode when the operational period has finished.

3. The method of claim 1, further comprising:
   receiving a request to enter a third operational mode whilst in the second operational mode, the third operational mode comprising at least a third arrangement of the first and second switches;
   determining a priority of the second and third operational modes at least in part by consulting said database of operational modes and their priorities;
   switching the control unit into the third operational mode when an operational period has finished, if the third operational mode has a higher priority than the first operational mode; and
   switching the control unit into the first operational mode when the operational period has finished otherwise.

4. The method of claim 1, further comprising:
   receiving a request to enter a third operational mode whilst in the second operational mode, the third operational mode comprising at least a third arrangement of the first and second switches;
   determining a priority of the first, second and third operational modes at least in part by consulting said database of operational modes and their priorities; and switching the control unit into the third operational mode immediately, only if the third operational mode has a higher priority than the first and second operational modes.

5. The method of claim 4, wherein the second operational mode cannot be replaced with a third operational mode when the second operational mode is operational unless the third operational mode has a priority greater than a predetermined minimum, where the priority of the predetermined minimum is higher than the priority of the second operational mode.

6. The method of claim 1, wherein the priority of at least the second operational mode increases with time after a request for the second operational mode has been made, while the second operational mode is not operating.

7. The method of claim 1, wherein the electrical system comprises a main battery and an auxiliary battery, the first switch being arranged such that operating the first switch isolates the auxiliary battery from at least one component within the electrical system.

8. The method of claim 1, wherein the priority of at least the second operational mode is determined in part by the request.

9. The method of claim 8, wherein the request includes a factor relating to an urgency of the request, which factor serves to alter the priority of the second operational mode as retrieved from said database.

10. The method of claim 9, wherein said factor relates to a state of charge of an auxiliary battery.

11. The method of claim 1, wherein said second operational mode comprises a fourth arrangement of the first and second switches, the method comprising the electrical system switching between the second arrangement of the first and second switches and the fourth arrangement of the first and second switches while the second operational mode is operational.

12. An electrical system for use in a vehicle, the electrical system comprising:
  a first switch and a second switch arranged such that operating the first and second switches will isolate parts of the electrical system;
  a control unit configured to operate the first and second switches; and
  a database of operational modes and their priorities, said operational modes comprising at least different arrangements of said first and second switches,
  wherein the control unit is configured to control the electrical system according to the method of claim 1.

13. The electrical system of claim 12, wherein the electrical system comprises a main battery and an auxiliary battery, the first switch being arranged such that operating the first switch will isolate the auxiliary battery from at least one component within the electrical system.

14. A vehicle comprising the electrical system of claim 12.

15. A vehicle comprising an internal combustion engine and an electrical system having the following components:
  a) a main battery configured to power a starter motor for the engine;
  b) an electrical load;
  c) a generator;
  d) an auxiliary battery;
  e) first and second switches connected to the main and auxiliary batteries respectively to selectively connect the main and auxiliary batteries to the electrical load; and
  f) a control unit,
  wherein the control unit is adapted to operate the first and second switches between different operational modes of the electrical system, which operational modes have different relative priorities assigned at least in part by a database of said operational modes and their priorities, wherein the control unit is adapted:
    i) to put the electrical system into a first operational mode, the first operational mode comprising at least a first arrangement of the first and second switches;
    ii) receive a request to enter a second operational mode, the second operational mode comprising at least a second arrangement of the first and second switches;
    iii) determine a priority of the first and second operational modes at least in part by consulting the database;
    iv) switch the control unit into the second operational mode if the second operational mode has a higher priority than the first operational mode or when the first operational mode ceases; and
    v) continue in the first operational mode otherwise.

16. A vehicle as claimed in claim 15, wherein said first and second operational modes are selected from the group comprising:
  a) said main battery being connected to said electrical load and said auxiliary battery being isolated therefrom, being a normal-driving operational mode;
  b) said main battery being connected to said starter motor and said auxiliary battery being connected to said electrical load, being an engine-starting operational mode during stop start operation of the vehicle;
  c) said main battery being connected to said electrical load and said auxiliary battery being connected to the generator, being an auxiliary-battery-charging operational mode;
  d) a sequence of connections, in which:
    vi) first, said main battery is connected to said electrical load and the auxiliary battery is disconnected therefrom, a first current drain on the first battery being measured, and
    vii) second, said main battery and the auxiliary battery is connected to said electrical load, a second current drain on the first battery being measured, whereby a charge of the auxiliary battery may be estimated.

* * * * *